J. C. BIGELOW.
STIRRING DEVICE.
APPLICATION FILED MAY 28, 1915.
1,200,301.
Patented Oct. 3, 1916.
2 SHEETS—SHEET 1.
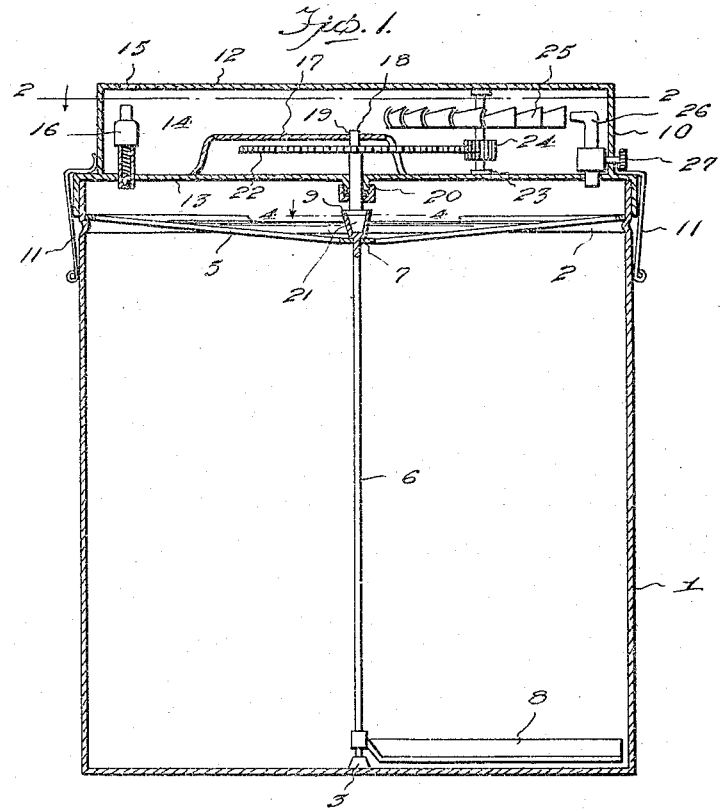
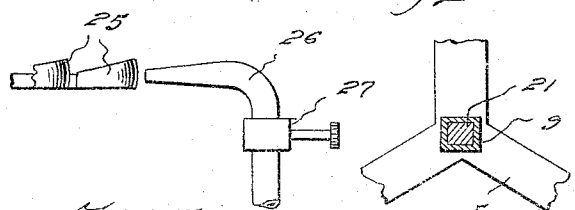
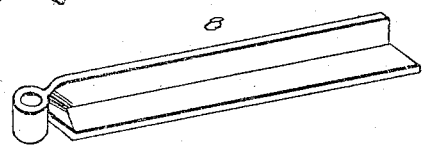
Witnesses
B. M. Hunt.
J. W. Garner
Inventor
J. C. Bigelow
By
Attorney

J. C. BIGELOW.
STIRRING DEVICE.
APPLICATION FILED MAY 28, 1915.

1,200,301.

Patented Oct. 3, 1916.
2 SHEETS—SHEET 2.

Witnesses

Inventor
J. C. Bigelow.
By
Attorney

UNITED STATES PATENT OFFICE.

JOSEPH C. BIGELOW, OF OLYMPIA, WASHINGTON.

STIRRING DEVICE.

1,200,301.  Specification of Letters Patent.  Patented Oct. 3, 1916.

Application filed May 28, 1915. Serial No. 30,952.

*To all whom it may concern:*

Be it known that I, JOSEPH C. BIGELOW, a citizen of the United States, residing at Olympia, in the county of Thurston and State of Washington, have invented certain new and useful Improvements in Stirring Devices; and I do hereby declare the following to be a full, clear, and exact description of the invention, such as will enable others skilled in the art to which it appertains to make and use the same.

This invention relates to improvements in cooking vessels such as are used for stewing and boiling and especially with reference to means operated by steam from the vessel for stirring the contents and preventing the same from burning or sticking to the bottom, during the cooking process.

The invention consists in the construction, combination and arrangement of devices hereinafter described and claimed.

Figure 2:
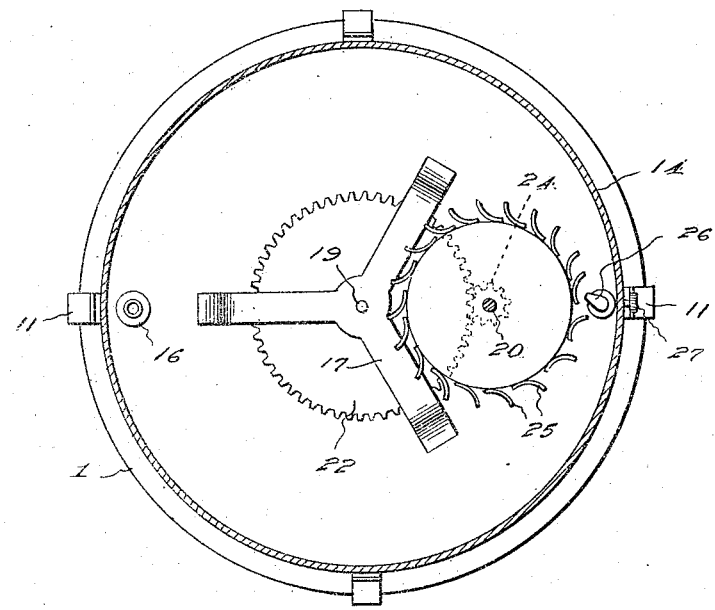
Figure 3:
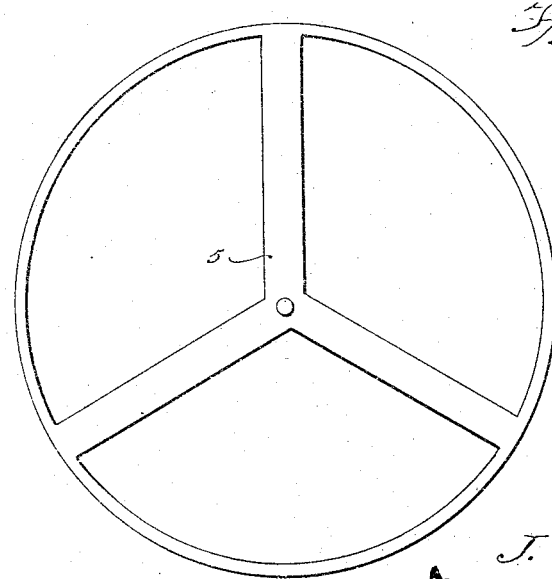

In the accompanying drawings:—Figure 1 is a vertical central sectional view of a self stirring cooking vessel constructed in accordance with my invention. Fig. 2 is a horizontal sectional view of the same on the plane indicated by the line 2—2 of Fig. 1. Fig. 3 is a detail plan of the spider. Fig. 4 is a detail sectional view on the plane indicated by the line 4—4 of Fig. 2. Fig. 5 is a detail elevation of the steam jet nozzle and the turbine. Fig. 6 is a detail perspective view of the stirrer.

The vessel 1 may be of any suitable size, may be of any suitable material and is here shown as cylindrical in form. The wall of the vessel is provided at a suitable distance from its open upper end with an inwardly extending annular bead or flange 2. On the bottom of the vessel is a centrally arranged step bearing 3. A spider or frame 5, shown in detail in Fig. 3, is detachably fitted in the upper portion of the vessel and rests on the flange 2. A vertically arranged stirring shaft 6 has a bearing as at 7 in the center of the spider and has its lower end stepped in the bearing 3. A stirring arm 8 is attached to the lower portion of said shaft, arranged immediately above the bottom of the vessel and is rotated by and with said shaft, its function being to prevent the contents of the vessel from sticking to the bottom and burning. At the upper end of the shaft is a non-circular socket piece 9.

The cover 10 which is detachably fitted on the top of the vessel 1 and secured by pivotally mounting fastenings 11 is provided with a top wall 12 and also with a bottom 13 which is spaced from the top so that a chamber 14 is formed in the cover. The top has a steam escape opening 15. A safety valve 16 is below said opening as shown. A frame 17, which is here shown as having radial arms, is secured on the center of the bottom 13 and arranged in the chamber 14.

A vertical shaft 18 has a bearing at 19 in the center of the frame 17 and also has a bearing in a stuffing box 20 in the center of the bottom 13. The lower end of this shaft is provided with a non-circular portion or stud 21 to fit in the correspondingly shaped socket piece 9 of the shaft 6 to detachably connect the shafts together and enable the cover, together with the shaft 18 to be removed from the vessel without affecting the stirrer shaft 6. Said shaft 18 has a spur gear 22. A vertical shaft 23 is also provided which is mounted in bearings in the top 12 and bottom 13 of the cover, is provided with a pinion 24 which engages the gear 22 and is also provided with a steam rotor or turbine 25. A steam jet nozzle 26 is connected to the bottom 13 and arranged to discharge steam from the vessel against the blades in the periphery of the rotor or turbine, to actuate the latter and is provided with a controlling valve 27.

It will be understood that the steam from the vessel is utilized to keep the turbine or rotor in operation and hence the stirrer which is geared to the turbine is kept in rotation immediately above the bottom of the vessel so that the contents are provided to keep them from burning or sticking during the cooking process.

Having thus described my invention, I claim:

1. In combination, a cooking vessel, a stirrer therein, and a steam actuated rotor to rotate the stirrer and being operated by steam generated in the vessel.

2. A cooking vessel, a rotary stirrer mounted therein, a cover for the vessel forming a steam chamber, a steam operated rotor arranged in the chamber and driving connections between said rotor and stirrer to cause the latter to be operated by the rotor upon the generation of steam in the vessel.

3. A cooking vessel of the character described including a stirrer therein having a vertical shaft mounted in the bearing in the vessel, a removable cover for the vessel formed with a steam chamber, a shaft having its bearings in said cover detachably jointed to the stirrer shaft and also provided with a gear, a rotor also mounted in the cover and having a pinion engaging said gear, and a steam jet nozzle arranged vertically in said chamber, and having a right angle portion adapted to direct steam from the vessel in a jet against the rotor to operate the latter and hence also operate the stirrer upon generation of steam within the vessel.

In testimony whereof I affix my signature in presence of two witnesses.

JOSEPH C. BIGELOW.

Witnesses:
W. A. KOOGE,
GEORGE R. BIGELOW.

Copies of this patent may be obtained for five cents each, by addressing the "Commissioner of Patents, Washington, D. C."